(12) United States Patent
Dixon

(10) Patent No.: US 10,582,694 B2
(45) Date of Patent: Mar. 10, 2020

(54) COMBINATION FEED AND HAY FEEDER

(71) Applicant: Larry Dixon, Liberty, MS (US)

(72) Inventor: Larry Dixon, Liberty, MS (US)

( * ) Notice: Subject to any disclaimer, the term of this patent is extended or adjusted under 35 U.S.C. 154(b) by 411 days.

(21) Appl. No.: 15/719,529

(22) Filed: Sep. 28, 2017

(65) Prior Publication Data

US 2019/0090453 A1    Mar. 28, 2019

(51) Int. Cl.
*A01K 5/00* (2006.01)
*A01K 5/02* (2006.01)

(52) U.S. Cl.
CPC ............................ *A01K 5/0225* (2013.01)

(58) Field of Classification Search
CPC .......... A01K 5/002; A01K 5/00; A01K 5/001; A01K 5/004; A01K 5/0258; B01F 13/0035
USPC ........... 119/57.92, 57.2, 57.4, 57.5; 366/603; 241/605
See application file for complete search history.

(56) References Cited

U.S. PATENT DOCUMENTS

| | | | |
|---|---|---|---|
| 3,672,640 A | 6/1972 | Crose | |
| 4,506,990 A | 3/1985 | Neier et al. | |
| 5,069,165 A | 12/1991 | Rousseau | |
| 5,243,930 A | 9/1993 | Rahm | |
| 5,947,055 A * | 9/1999 | Cross | A01K 1/10 119/58 |
| 6,263,833 B1 * | 7/2001 | Runyan | A01K 5/00 119/51.11 |
| 6,834,989 B2 * | 12/2004 | Tamminga | A01K 5/004 241/101.761 |
| 2005/0063249 A1 * | 3/2005 | Tamminga | A01K 5/004 366/192 |
| 2007/0297284 A1 * | 12/2007 | Neier | B01F 7/081 366/299 |
| 2012/0037079 A1 | 2/2012 | Rasmussen et al. | |
| 2013/0327277 A1 | 12/2013 | Aton | |
| 2016/0374311 A1 | 12/2016 | Lahman et al. | |
| 2019/0053433 A1 * | 2/2019 | Borchers | A01D 87/127 |

OTHER PUBLICATIONS

Beaver Valley Supply Co., Inc., "Applegate Feed Train UTV Feeder", http://www.beavervalleysupply.com/sectionj/ft4.htm, 3 pages, retrieved Sep. 27, 2017.
Cattle 3C Feeders, "Cattle 3C Feeders Clients", http://www.3cfeeders.com/clients.html, 2008, 2 pages, retrieved Sep. 27, 2017.

(Continued)

*Primary Examiner* — Yvonne R Abbott-Lewis
(74) *Attorney, Agent, or Firm* — Precipice IP PLLC; Angela J. Grayson; Bruce Johnson

(57) ABSTRACT

Embodiments disclosed herein provide livestock or wildlife feeder implements that are configured to attach to the three-point hitch of a conventional tractor or to another type of vehicle. In some embodiments, a mobile feeder implement includes a hopper for holding a quantity of livestock feed, and one or more hay spears capable of holding one or more bales of hay to a desired location. The mobile feeder implement is remotely controlled by a user to dispense a desired amount of feed from the hopper at any desired location, without the user having to leave the safety of the tractor or other vehicle. Similarly, the mobile feeder implement allows the user to place the bale of hay where desired without having to leave the safety of the tractor or other vehicle.

20 Claims, 5 Drawing Sheets

(56) References Cited

OTHER PUBLICATIONS

Eze-Feeder by Reimer, "EZE-Feeder by Reimer", http://www.ezefeeder.ca/eze-feeder-gallery/, 2017, 3 pages, retrieved Sep. 27, 2017.
Stull Feeders, "Stull Feeders", https://www.stullfeeders.com/ecommerce/, 2 pages, retrieved Sep. 27, 2017.
T&S, "T & S Trip Hopper Range Cattle Feeders", http://tsfeeders.com/, 5 pages, retrieved Sep. 27, 2017.
Triple C Inc., "HydraFeeder by Triple C. Inc.", http://www.triple-c-inc.com/hydraulic-supplement-feeder 2012, 5 pages, retrieved Sep. 27, 2017.

* cited by examiner

COMBINATION FEED AND HAY FEEDER

TECHNICAL FIELD

The disclosure relates in general to apparatuses, methods, and systems for feeding animals. More specifically, the disclosure relates implements to an apparatus, methods, and systems for feeding animals using a mobile feeder implement coupled to a tractor or other vehicle to selectively move and dispense feed.

BACKGROUND

In the field of livestock farming, it is usually necessary to move and dispense feed to the livestock. There are numerous prior art methods for delivering livestock feed. For example, a farmer may load a truck or wagon with a supply of feed and drive to one or more feeding locations. Once at a feeding location, the farmer will dispense a desired amount of feed, either manually or in some automated fashion. If dispensed manually, the farmer typically leaves the safety of the vehicle to manually dispense feed. In other examples, a dispensing mechanism may include an auger or other device for dispensing fee.

Dispensing feed manually is very labor intensive. In addition, depending on the type and disposition of the livestock, feeding the livestock manually carries some risk of injury. For example, when a farmer is standing amongst the livestock holding a 50 pound sack of feed, the livestock will typically attempt to get to the feed all at once, bumping into each other and potentially causing injury to the farmer. Another problem is that, whether dispensed manually or in an automated fashion, it can also be difficult to dispense a precise quantity of feed.

There is therefore a need for a feeder implement that functions as a mobile livestock feeder that is safe, accurate, and easy to operate. There is also a need for a mobile livestock feeder device that can deliver multiple types of feed.

SUMMARY OF THE DISCLOSURE

An apparatus is provided for providing a mobile feeder implement configured to attach to a tractor having a three-point hitch and a hydraulic system, the feeder implement including a hopper having a front wall, a rear wall, and opposing side walls forming a reservoir for holding feed, the hopper having a top end and a bottom end, a plurality of padeyes coupled to the front wall of the hopper, the plurality of padeyes configured to attach to a three-point hitch of a tractor, an opening formed in the hopper proximate the bottom end for dispensing feed from the reservoir, a door configured to slide between an open position and a closed position to enable feed to be gravity fed through the opening when the door is in the open position, one or more agitators coupled to the door for agitating feed in the reservoir when the door slides between the open position and the closed position, at least one hydraulic cylinder coupled to the hopper and the door for moving the door between the open position and the closed position, one or more hydraulic hoses configured to couple to a hydraulic system of the tractor to enable a user of the tractor to control the position of the door, a transparent window formed in front wall of the hopper to provide a visual indication of the volume of feed contained in the reservoir, and a hay spear extending outward from the rear wall of the hopper for securing one or more bales of hay to the feeder implement.

Another embodiment provides a mobile feeder implement configured to attach to a tractor including a hopper having a front wall, a rear wall, and opposing side walls forming a reservoir for holding feed, the hopper having a top end and a bottom end, the hopper being configured to couple the tractor, a dispensing outlet formed in the hopper proximate the bottom end of the hopper for dispensing feed from the reservoir, a movable door configured to move between an open position and a closed position to enable feed to be gravity fed through the dispensing outlet when the door is in the open position, an actuating device coupled to the door for moving the door between the open position and the closed position, and a hay spear extending outward from the rear wall of the hopper for securing one or more bales of hay to the feeder implement.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Generally, the present invention relates to livestock and wildlife feeder implements that are configured to attach to the three-point hitch of a conventional tractor. A feeder implement may also be configured to attach or mount to any other type of vehicle, trailer, etc. In some embodiments, a mobile feeder implement includes a hopper for holding a quantity of livestock feed, while also being able to carry bales of hay to a desired location. The mobile feeder implement can be remotely controlled by a user to dispense a desired amount of feed from the hopper at a desired location without the user having to leave the safety of the tractor. Similarly, the mobile feeder implement allows the user to place the bale of hay where desired without having to leave the safety of the tractor.

Figure 1:
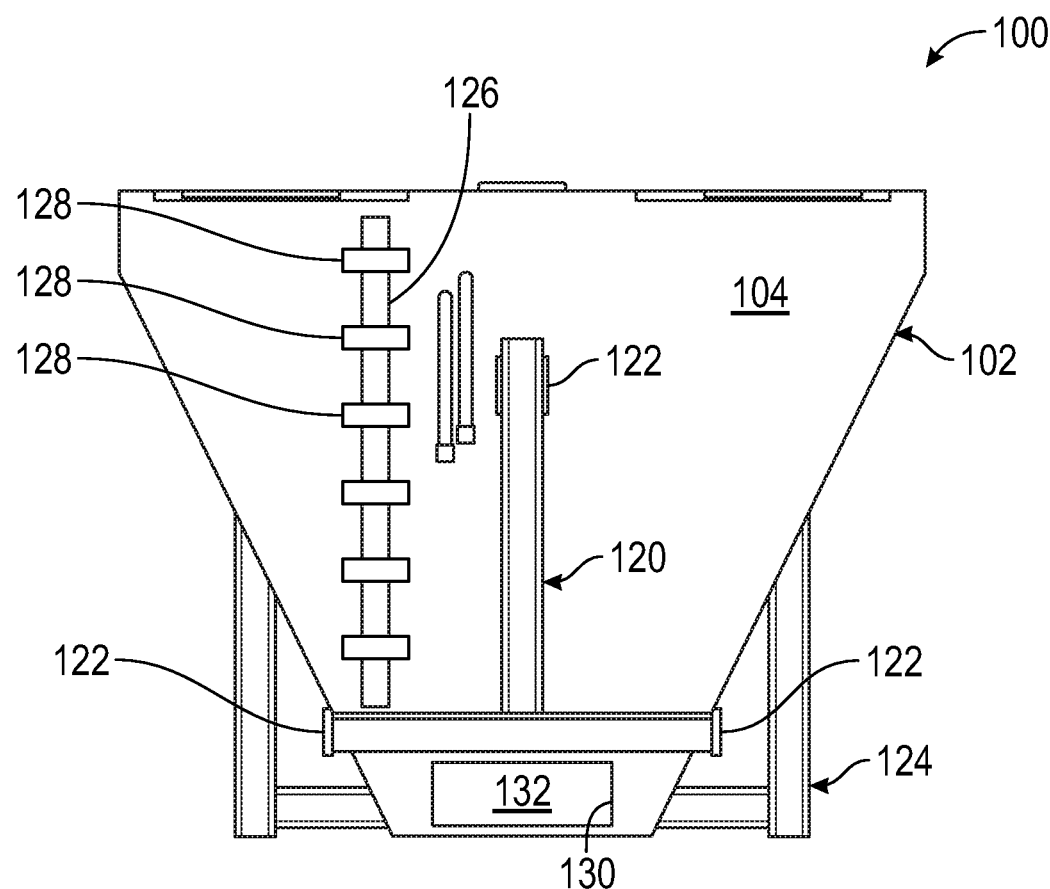
FIG. 1 is a front view of a mobile feeder implement.
Figure 2:
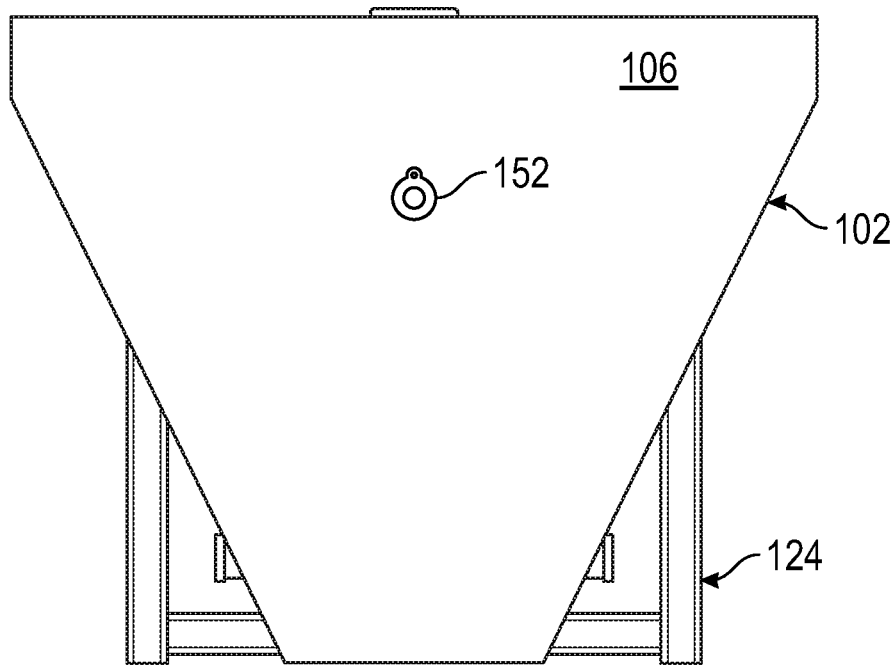
FIG. 2 is a rear view of the mobile feeder implement.
Figure 3:
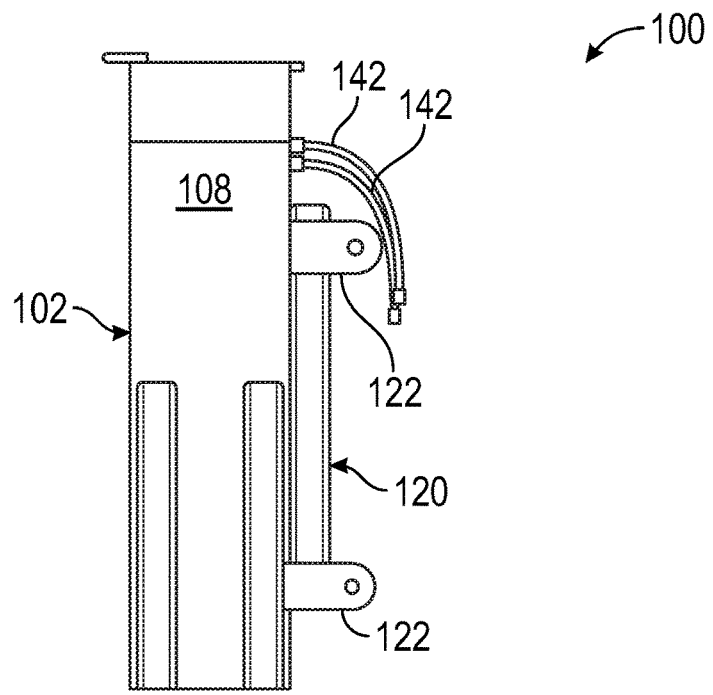
FIG. 3 is a side view of the mobile feeder implement.
Figure 4:
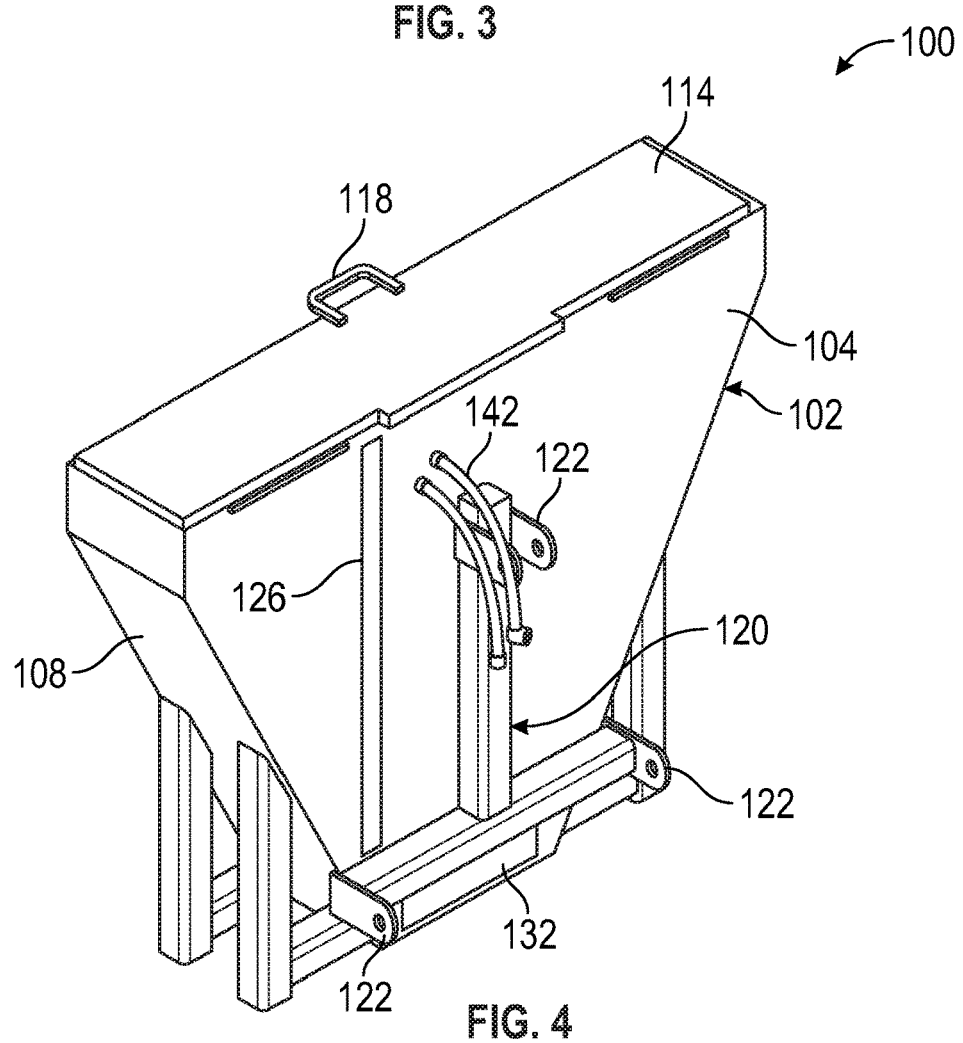
FIG. 4 is an isometric front view of the mobile feeder implement.
Figure 5:
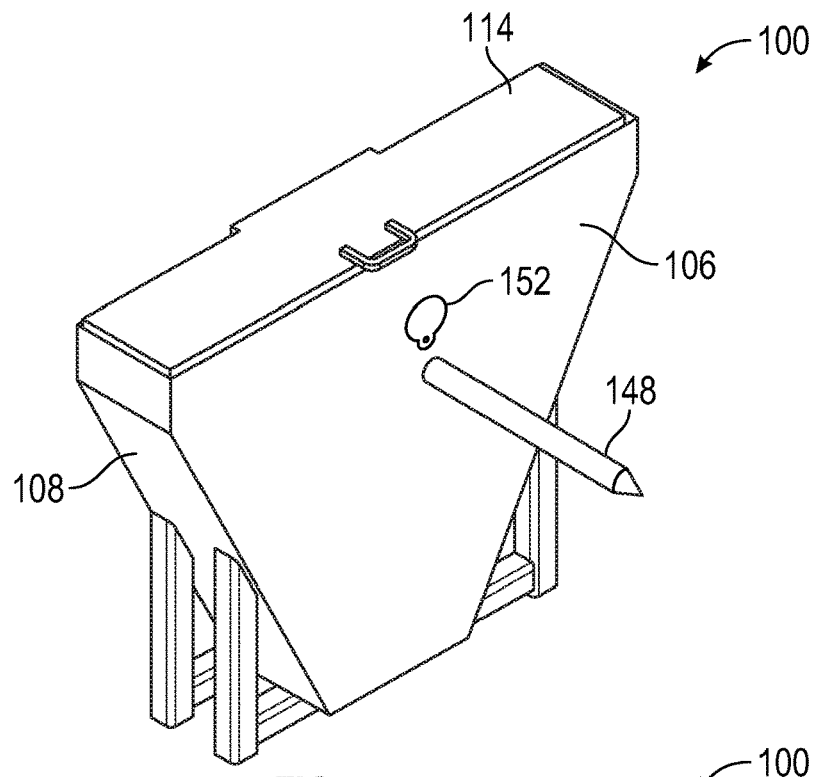
FIG. 5 is an isometric rear view of the mobile feeder implement with a hay spear installed.
Figure 6:
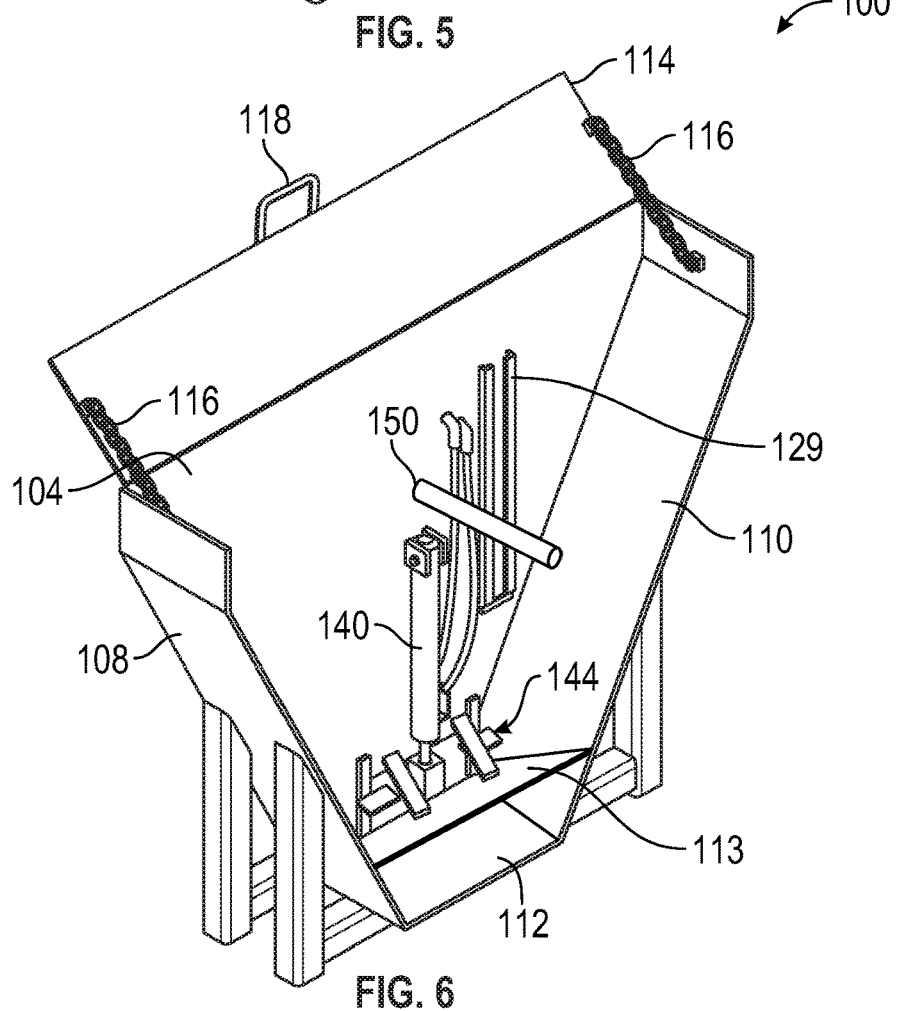
FIG. 6 is a partial isometric rear view of the mobile feeder implement, showing the interior of the hopper.
Figure 7:
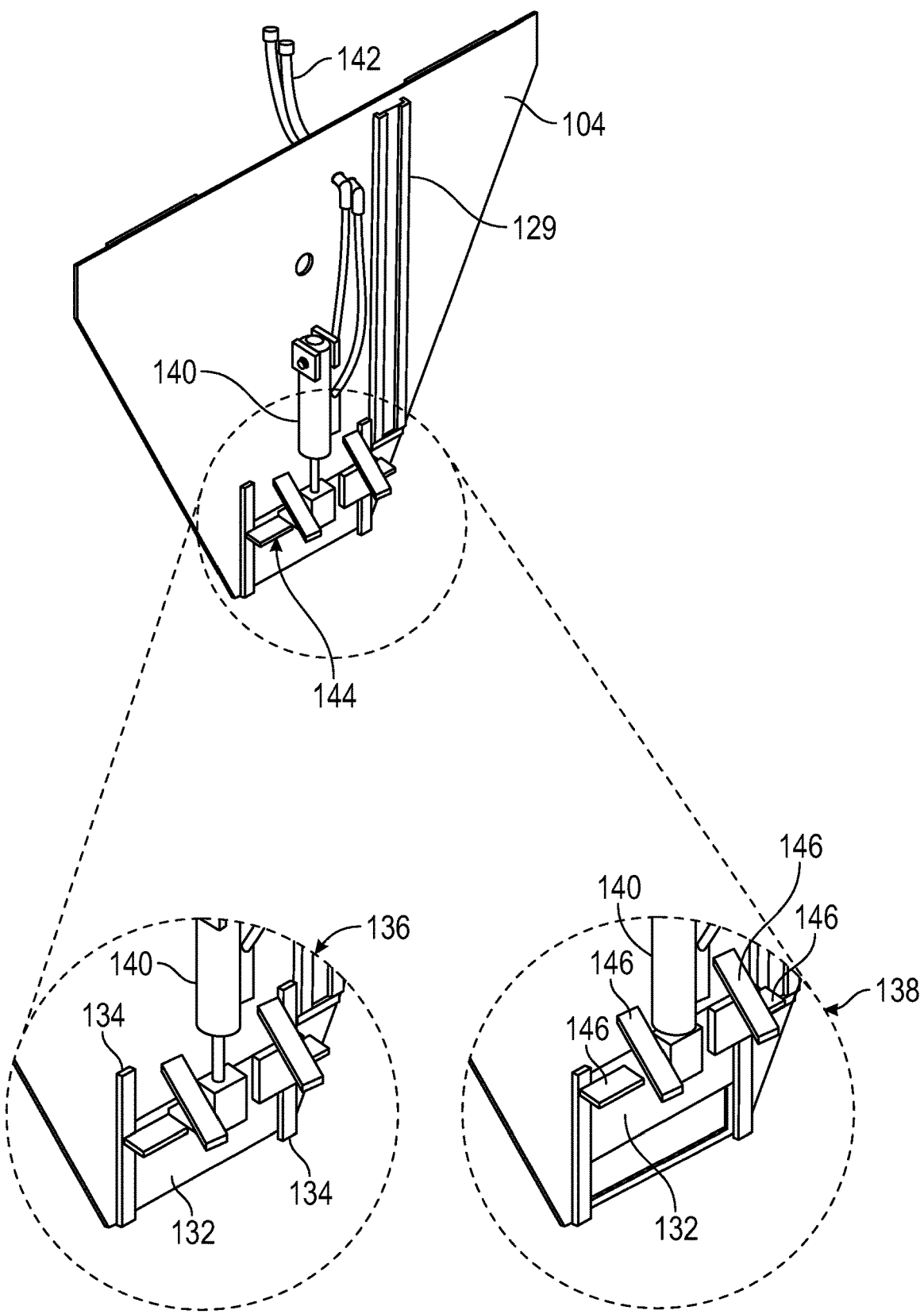
FIG. 7 is a partial isometric rear view of the mobile feeder implement including enlarged views of the feeder door in the opened and closed positions.
Figure 8A:
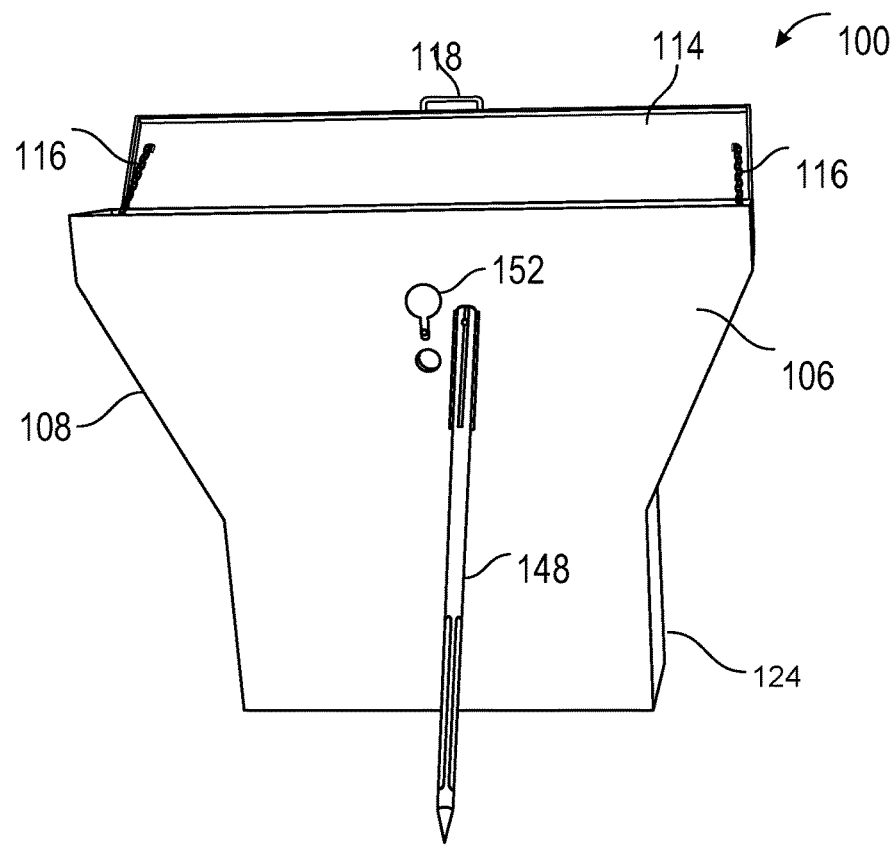
FIG. 8a is an isometric front view of the mobile feeder implement including a hay spear and stabilizer structure comprised of steel plates.
Figure 8B:
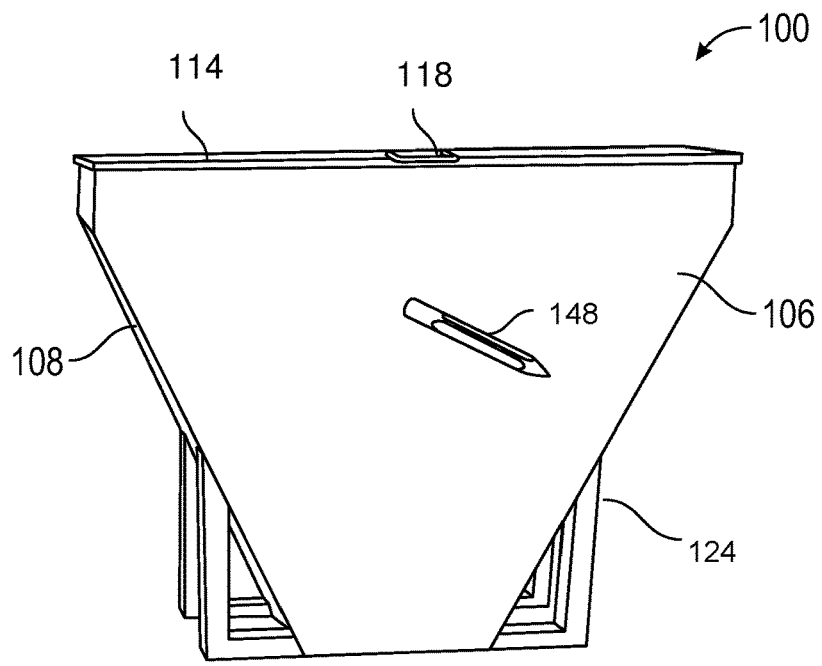
FIG. 8b is an isometric front view of the mobile feeder implement, including a hay spear and stabilizer structure comprised of steel tubing.

FIG. 1 through FIG. 8b show various views and embodiments of a mobile feeder implement. Numerous other embodiments and examples are also possible within the spirit and scope of the invention. FIG. 1 is a front view of a mobile feeder implement 100. FIG. 2 is a rear view of the mobile feeder implement 100. FIG. 3 is a side view of the mobile feeder implement 100. FIG. 4 is an isometric front view of the mobile feeder implement 100. FIG. 5 is an isometric rear view of the mobile feeder implement with a hay spear installed. FIG. 6 is a partial isometric rear view of the mobile feeder implement 100, showing the interior of the hopper. FIG. 7 is a partial isometric view of the mobile feeder implement 100 including enlarged views of the hopper door in the opened and closed positions.

As shown in the Figures, a hopper 102 is defined by a front wall 104 (FIG. 1), a rear wall 106 (FIG. 2), opposing sidewalls 108 and 110 (FIGS. 3-6), and bottom wall 112 (FIG. 6) forming a reservoir for holding feed. An angled flow plate 113 (FIG. 6) can be positioned above the bottom wall 112 to help guide feed out of the hopper 102 as feed is dispensed. A hinged lid 114 is coupled to the top of the hopper 102 to allow a user to fill the hopper 102 with feed. The lid 114 can be opened (FIG. 6) to allow access to the interior of the hopper 102 and closed (FIG. 5) to seal the hopper 102 once it is filled with feed. In the example shown in FIG. 6, a pair of chains 116 restrict how far the lid 114 can open. A handle 118 is coupled to the lid 114 for ease of use by a user.

As mentioned above, the mobile feeder implement 100 is attachable to the three-point hitch of a tractor. The mobile feeder implement 100 includes a T-shaped mounting rack 120 coupled to the hopper 102. The mounting rack 120 has multiple padeyes 122 positioned on the mobile feeder implement 100 to attach to the corresponding mounting portions of the three-point hitch of a tractor. When attached to a tractor, a user can manipulate the position of the mobile feeder implement 100 by controlling the three-point hitch on the tractor.

The mobile feeder implement 100 includes a stabilizer structure 124 to strengthen and stabilize the feeder implement 100. The structure 124, in one embodiment, is comprised of a plurality of square steel tubing pieces welded together as shown. In another embodiment, the stabilizer structure 124 may take the form of a plurality of "legs" positioned on the bottom of the feeder implement 100, and act as "legs" to stabilize the mobile feeder implement 100. In yet another embodiment (FIG. 8a), the stabilizer structure 124 is comprised of two integrated steel plates welded to the hopper 102 to create a seamless stabilizing element. The stabilizer structure 124 serves several purposes. For example, the stabilizer structure 124 strengthens and stabilizes the feeder implement 100. When the structure 124 is comprised of a plurality of square steel tubing pieces, the structure 124 can also function as to protect the bottom portion of the hopper 102 if the mobile feeder implement 100 is slammed to the ground. In particular, where a feeder door 132 actuator (hydraulic cylinder 140) is disposed outside of the hopper 102, the stabilizer structure 124 "legs" protect the actuator (hydraulic cylinder 140) from damage.

As shown best in FIGS. 1 and 4, the feeder implement 100 is incorporated with a graduated viewing window 126 substantially transparent and substantially elongated. The window 126 is formed vertically in the front wall 104 of the hopper 102. The viewing window 126 is transparent enough to provide a visual indication of the quantity and volume of feed in the hopper 102. As the feed is dispensed from the hopper 102, the user will be able to observe how much feed is left by viewing the level of feed through the viewing window 126. In some examples, a plurality of indicators 128 (FIG. 1) proximate the transparent viewing window are provided to help the user determine a precise, or near precise quantity of feed in the hopper 102. For example, each indicator 128 may generally correspond to 50 pounds of feed. The amount of feed corresponding to each indicator 128 will depend on the spacing of the indicators 128, as well as the type of feed. Regardless, a user can easily determine the amount of feed dispensed from the hopper 102 and the amount of feed remaining in the hopper 102 by observing the level of feed through the viewing window 126.

In one example, the viewing window 126 is comprised of a sheet of Plexiglas coupled to an opening formed in the front wall 104. The viewing window 126 can be coupled to the front wall 104 in any desired manner. For example, as shown in FIGS. 6-7, a channel 129 can be configured to receive a piece of Plexiglas. The indicators 128 can take any desired form. In one example, the indicators 128 are comprised of thin strips of steel welded across the viewing window 126. In other examples, the indicators 128 can be painted on the front wall 104 and/or on the Plexiglas. In other examples, electronic sensors can be implemented to provide more precise indications of the quantity of feed in the hopper 102.

To dispense feed from the hopper 102, a dispensing outlet 130 (FIG. 1) is formed in the front wall 104 of the hopper 102. In another example, the dispensing outlet 130 (and corresponding feeder door) can be formed in the bottom wall 112. Similarly, the dispensing outlet 130 can be formed in the rear wall 106. The dispensing outlet 130 is sealed by a feeder door 132 that can be remotely operated, as described below. In the examples shown, the feeder door 132 slides between a closed position (the enlarged partial view 136 of FIG. 7) and an open position (the enlarged partial view 138 of FIG. 7). When the feeder door 132 is in the open position, feed stored in the hopper 102 will flow through the dispensing outlet 130. When the feeder door 132 is closed, feed will stop flowing through the dispensing outlet 130. In some embodiments, the feeder door 132 can include highly visible tape, paint, etc., to provide a more clear indication of the position of the door to the user.

The feeder door 132 can be opened and closed in any desired manner using an actuating device, and specifically an actuating device having a user operable mechanical linkage. In the example shown in the Figures, the feeder door 132 is coupled to an actuating device having a user operable mechanical linkage such as a hydraulic cylinder 140. The hydraulic cylinder is operatively coupled to the hydraulic system of a tractor, via hydraulic hoses 142. From within the safety of the tractor, a user can control the hydraulic cylinder 140 to open and close the feeder door 132. The user can also control the distance that the feeder door 132 is open, to more precisely control the flow of feed through the dispensing outlet 130. In this way, a user can precisely control the flow rate of feed through the dispensing outlet 130, and thus control the quantity of feed fed to livestock.

In the example shown in FIGS. 6-7, the hydraulic cylinder 140 is disposed within the hopper 102. In other examples (not shown), the hydraulic cylinder 140 can be disposed external to the hopper 102.

The hopper door 132 can be controlled in any desired manner. In one example, the feeder door 132 is manipulated by an actuating device such as the hydraulic cylinder 140 shown in the Figures, an electric motor, etc. In other examples, the feeder door 132 can be manually controlled by a user. For example, the feeder door 132 can include a handle or lever movable by a user to manually dispense feed. If desired, one or more springs can be used to bias the feeder door in the opened or closed position. In another example, the feeder door 132 can be operatively coupled to a linkage that can be remotely manipulated by a user from safety of the tractor. Such a linkage could comprise a rope, chain, steel rods, etc., or a combination thereof.

Certain types of feed, for example range cubes, may tend to bind and require agitation to keep the feed flowing through the dispensing outlet 130. The feeder door 132 shown in FIGS. 6-7 includes an integrated agitator 144 comprised of agitator members 146 which are flat plates coupled to the feeder door 132 that automatically agitate the feed when the feeder door 132 slides up and down from the open to the closed position. The agitator members 146 that comprise the agitator 144 are flat plates, or substantially flat plates, where two or more of the flat plates are oriented in different planes (see FIG. 7). In one example, the agitator 144 includes a plurality of agitator members 146 coupled to the feeder door 132 at various positions and angles, as shown. In the example shown, the agitator 144 includes four agitator members 146, with two disposed generally horizontal, and two disposed at an angle. The size, position, and number of agitator members 146 can vary, as desired. When the feeder door 132 slides up and down, the agitator members 146 move through the feed and stir the material inside to enhance the gravitational free flow of material from the hopper 102 while the feeder door 132 is in the opened position. The agitator 144 shown in the Figures, requires no moving parts (other than the movement of the agitator relative to the feeder door 132) and thus is simple and less prone to malfunction.

As mentioned above, the mobile feeder implement 100 is also capable of moving and selectively placing a bale of hay where desired. In one example, the mobile feeder implement 100 has a hay spear 148 (FIG. 5) extending outward from the rear wall 106. In one example, the hay spear 148 is comprised of a steel rod terminating at a point. With the mobile feeder implement 100 attached to the three-point hitch of a tractor, a user can back the mobile feeder implement 100 into a bale of hay, causing the hay spear 148 to penetrate the bale of hay. When the mobile feeder implement 100 is raised (via the three-point hitch of the tractor), the speared bale can be lifted and moved. The hay Bale can be placed where desired by lowering the mobile feeder implement 100, and driving forward.

In the embodiment shown in the figures, the hay spear 148 is removable, enabling a user to use the mobile feeder implement 100 with or without a hay spear 148. As shown best in FIG. 6, a hay spear pipe sleeve 150 is coupled to the hopper 102 at the front and rear walls 104 and 106. A corresponding opening is formed in the rear wall 106, allowing the hay spear 148 to be received into the pipe sleeve 150. When the hay spear 148 is inserted into the pipe sleeve 150, a bolt or pin can be inserted through both the pipe sleeve 150 and a spear 148 through holes formed in each. To remove the hay spear 148, the pin or bolt can be removed, and the hay spear 148 can be pulled out of the pipe sleeve 150. If desired, the hay spear 148 can be stored within the hopper 102. In other examples, multiple hay spears can be used to more securely secure a bale of hay. If desired, a pipe sleeve hole cover 152 (FIGS. 2 and 5) can be rotatably secured to the rear wall 106 to cover the opening when the hay spear 148 is not being used.

As clearly shown in the drawings, the hopper 102 of the mobile feeder implement 100 has a generally a trapezoid shape with a cross-section that decreases in area from the top of the hopper 102 to the bottom wall 112. In one example, the hopper 102 is 48 inches high (measured from the bottom wall 112 and the lid 114) and 60 inches wide (measured from the sidewalls 108 and 110). In this example, the hopper 102 has a depth (measured between the front wall 104 and the rear wall 106) of 12 inches. As shown best in FIGS. 1 and 2, at the top 6 inches of the hopper, the sidewalls 108 and 110 are vertical, and then extend downward at an angle to the bottom wall 112.

The height, width, and depth described above results in a relatively long, thin hopper and substantially trapezoidal shaped structure that has been found to reliably dispense feed, while also providing a compact hopper than can easily be moved and manipulated by a tractor. In the provided example, the hopper has a height to depth ratio of approximately 4.0 and a width to depth ratio of approximately 5.0. Note that these dimensions provide merely one example, and that the hopper 102 can be designed as desired. In addition, the Hopper can take on other shapes such as a cone, cylinder, etc.

The invention described above can be used in many ways. Following is one exemplary description of the operation of the invention. In this example, it will be assumed that a user is using the mobile feeder implement 102 provide feed and also a bale of hay to livestock. Of course, the mobile feeder implement 100 can be used to only dispense feed or to only move and place bales of hay.

If the mobile feeder implement 100 is not already coupled to a tractor, the user may couple and connect the mobile feeder implement 100 to a tractor via the front or rear of the tractor. The coupling or connection may be made using a quick connect interface on the mobile feeder implement 100 to the quick connect connection interface of tractor. Alternatively, the user will connect the mounting rack 120 of the mobile feeder implement 100 to the three-point hitch of the tractor. If connecting the mobile feeder implement 100 to the rear of a tractor, the mobile feeder implement 100 can be configured to attach to quick connect points of a tractor or the three-point hitch of the tractor using padeyes 122 (FIGS. 3 and 4). In the embodiment of the invention presented in FIGS. 3 and 4, Once the padeyes 122 of the mounting rack 120 are aligned with the corresponding parts of the three-point tractor hitch, tractor lift arms are coupled and connected to lift arm pins. Once connected, a lynch pin is inserted to complete the couple or connection. FIG. 4 is shown having double padeyes 122 at the top and single padeyes 122 at the bottom of the mounting rack 120. In another configuration, the bottom lifting point padeyes 122 can be configured as double padeyes 122 rather than single padeyes 122. Double padeyes 122 at the bottom of the mounting rack 120 can be used when more stability and control are needed given the size of the load and the size and weight of the hopper 102.

The user can load the hopper 102 with the desired type and quantity of feed by opening the lid 114 and scooping, pouring, or auguring the feed in through the top of the hopper 102. Once the feed is loaded into the hopper 102, the lid 114 can be closed.

If the hay spear 148 is not already installed, the user can install the hay spear 148 (preferably before the feed is loaded in the hopper 102) by opening the hole cover 152 and inserting the hay spear 148 into the hay spear pipe sleeve 150. The hay spear 148 can be secured by inserting a pin or bolt through the corresponding holes in the hay spear 148 and pipe sleeve 150.

To secure a bale of hay to the feeder implement 100, the user will lower the feeder implement 100 to an appropriate height and back feeder implement 100 toward the bale of hay, causing the hay spear 148 to be inserted into the bale of hay. When the user raises the mobile feeder implement 100 via the three-point hitch of the tractor, the hay bale will be raised off the ground and can be moved where desired. If the tractor is so equipped, a second bale of hay can be carried at the front of the tractor, for example, via hay spear coupled to a front-end loader.

With the hopper 102 full of feed and a bale of hay speared by the hay spear 148, the user can drive the tractor to any desired location. When the user wants to place the bale of hay, the mobile feeder implement 100 is lowered via the three-point hitch of the tractor until the bale is resting on the ground. When the user drives the tractor forward, the hay spear 148 will be pulled out of the bale and the bale of hay will remain where placed.

The feed can be dispensed from the hopper 102 in any desired manner. For example depending on the type of livestock and the size of the herd, a user may want to dispense the feed in multiple places. In other examples, the feed can be dispensed all in one place. In other examples, the feed can be dispensed into a trough. To make dispensing feed into a trough the most efficient, a relatively shallow trough can be used that has a height less than the lowest point of clearance of the tractor. In this way, the user can drive over the trough and open the feeder door 132 while driving over the trough. In another example, the feed can simply be dispensed in piles on the ground in any desired location.

When the feed is dispensed by opening the feeder door 132, the agitator 144 will slide up and down with the feeder door 132, causing the agitator members 146 to stir the feed to improve the flow of feed through the dispensing outlet 130.

The mobile feeder implement 100 thus allows a person to distribute animal feed and/or hay from the safety of being seated on the tractor without being on the ground with the potential of being injured whilst amongst the animals.

The materials used to construct the mobile feeder implement 100 and hopper 102 may be comprised of heavy-duty steel plates for longevity. Other materials such as metal, plastic, or composite materials may also be used, as desired. For example, the hopper 102 may be constructed of plastic such as, but not limited to acrylonitrile-butadiene-styrene (ABS), acrylics, polyethylene (PE), polypropylene (PP), or polyvinyl chloride (PVC). The hopper 102 may be constructed of metals such as, but not limited to aluminum, steel, or stainless steel.

In the foregoing specification, the invention has been described with reference to specific embodiments. However, one of ordinary skill in the art appreciates that various modifications and changes can be made without departing from the scope of the invention. For example, the invention can be configured to be used with an all-terrain vehicle (ATV) such as a quad, quad bike, three-wheeler, four-wheeler, or quadricylce as defined by the American National Standards Institute (ANSI). When the invention used with an ATV vehicle, adjustments to scale can be made, and the mobile feeder implement 100 can be constructed of lightweight material such as plastic and configured to be mounted and secured to the back frame of the ATV to dispense feed manually, electrically, or by any suitable means. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein, and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A mobile feeder implement configured to attach to a tractor having a three-point hitch and a hydraulic system, the feeder implement comprising:
   a hopper having a front wall, a rear wall, and opposing side walls forming a reservoir for holding feed, the hopper having a top end and a bottom end;
   a plurality of padeyes coupled to the front wall of the hopper, the plurality of padeyes configured to attach to a three-point hitch of a tractor;
   an opening formed in the hopper proximate the bottom end for dispensing feed from the reservoir;
   a door configured to slide between an open position and a closed position to enable feed to be gravity fed through the opening when the door is in the open position;
   one or more agitators coupled to the door for agitating feed in the reservoir when the door slides between the open position and the closed position;
   at least one hydraulic cylinder coupled to the hopper and the door for moving the door between the open position and the closed position;
   one or more hydraulic hose configured to couple to a hydraulic system of the tractor to enable a user of the tractor to control the position of the door;
   a transparent window formed in front wall of the hopper to provide a visual indication of the volume of feed contained in the reservoir; and
   one or more hay spears extending outward from the rear wall of the hopper for securing one or more bales of hay to the feeder implement.

2. The mobile feeder implement of claim 1, further comprising a lid movably coupled proximate the top end of the hopper.

3. The mobile feeder implement of claim 1, wherein the door is configured to slide vertically between the open position and the closed position.

4. The mobile feeder implement of claim 1, wherein the door is configured to slide horizontally between the open position and the closed position.

5. The mobile feeder implement of claim 1, wherein the one or more agitators further comprise a plurality of flat plates coupled to the door, wherein at least two of the plurality of flat plates are oriented in different planes.

6. The mobile feeder implement of claim 1, wherein the transparent window has an elongated shape extending substantially from the top end and the bottom end of the hopper.

7. The mobile feeder implement of claim 6, further comprising indicators positioned proximate the transparent window to provide a visual indication of the volume of feed in the reservoir.

8. A mobile feeder implement configured to attach to a tractor comprising:
   a hopper having a front wall, a rear wall, a top end and a bottom end, and opposing side walls forming a reservoir for holding feed;
   a dispensing outlet formed in the hopper proximate the bottom end of the hopper for dispensing feed from the reservoir;
   a movable door configured to move between an open position and a closed position to enable feed to be gravity fed through the dispensing outlet when the door is in the open position;
   an actuating device coupled to the door for moving the door between the open position and the closed position; and
   one or more hay spears extending outward from the rear wall of the hopper for securing one or more bales of hay to the feeder implement.

9. The mobile feeder implement of claim 8, further comprising a lid movably coupled proximate the top end of the hopper.

10. The mobile feeder implement of claim 8, wherein the door is configured to slide vertically between the open position and the closed position.

11. The mobile feeder implement of claim 8, wherein the door is configured to slide horizontally between the open position and the closed position.

12. The mobile feeder implement of claim 8, further comprising one or more agitators coupled to the door for agitating feed in the reservoir when the door moves between the open position and the closed position.

13. The mobile feeder implement of claim 12, wherein the one or more agitators further comprise a plurality of flat plates coupled to the door, wherein at least two of the plurality of flat plates are oriented in different planes.

14. The mobile feeder implement of claim 8, further comprising a graduated transparent window formed in front wall of the hopper to provide a visual indication of the volume of feed contained in the reservoir.

15. The mobile feeder implement of claim 14, further comprising indicators positioned proximate the transparent window to provide a visual indication of the volume of feed in the reservoir.

16. The mobile feeder implement of claim 8, wherein the actuating device further comprises a prime mover coupled to the hopper and the movable door.

17. The mobile feeder implement of claim 16, wherein the prime mover is a hydraulic cylinder.

18. The mobile feeder implement of claim 16, wherein the prime mover is an electric motor.

19. The mobile feeder implement of claim 8, wherein the actuating device further comprises a user-operable mechanical linkage.

20. The mobile feeder implement of claim 8, further comprising a coupler configured to attached to a three-point hitch of a tractor.

* * * * *